US010598365B2

(12) United States Patent
Jensen et al.

(10) Patent No.: US 10,598,365 B2
(45) Date of Patent: Mar. 24, 2020

(54) PROXIMITY SENSOR SWITCHED AUTOMOTIVE LAMP COMPRISING AN ELECTRODE TO SENSE AN ELECTRIC FIELD THROUGH THE SENSING LOCATION FROM THE FACING SURFACE OF A LENS

(71) Applicant: Grakon, LLC, Des Moines, WA (US)

(72) Inventors: Paul J. Jensen, Seatac, WA (US); Steven P. Freeder, Renton, WA (US)

(73) Assignee: GRAKON, LLC, Des Moines, WA (US)

( * ) Notice: Subject to any disclaimer, the term of this patent is extended or adjusted under 35 U.S.C. 154(b) by 217 days.

(21) Appl. No.: 15/894,349

(22) Filed: Feb. 12, 2018

(65) Prior Publication Data

US 2019/0249853 A1 Aug. 15, 2019

(51) Int. Cl.
F21V 23/04 (2006.01)
F21V 7/00 (2006.01)
F21V 15/01 (2006.01)
F21V 31/00 (2006.01)
B60Q 3/82 (2017.01)
F21Y 115/10 (2016.01)
F21V 3/00 (2015.01)

(52) U.S. Cl.
CPC ............ F21V 23/0485 (2013.01); B60Q 3/82 (2017.02); F21V 7/0066 (2013.01); F21V 15/01 (2013.01); F21V 31/005 (2013.01); F21V 3/00 (2013.01); F21Y 2115/10 (2016.08)

(58) Field of Classification Search
CPC ....... B60Q 3/82; F21V 15/01; F21V 23/0485; F21V 31/005; F21V 3/00; F21V 7/0066

USPC .............................................. 250/221, 214 R
See application file for complete search history.

(56) References Cited

U.S. PATENT DOCUMENTS

| 2,825,795 | A | 3/1958 | Henninger |
| 6,152,882 | A | 11/2000 | Prutchi |
| 9,678,586 | B2 * | 6/2017 | Reynolds ............... G06F 3/041 |
| 2010/0085327 | A1 | 4/2010 | Sleeman |
| 2012/0071870 | A1 | 3/2012 | Salahieh et al. |
| 2014/0252213 | A1 | 9/2014 | Ruh |

(Continued)

FOREIGN PATENT DOCUMENTS

KR 20170000289 1/2017

OTHER PUBLICATIONS

International Search Report and Written Opinion, dated Apr. 24, 2019, received in International Patent Application No. PCT/US2019/015265.

*Primary Examiner* — Que Tan Le
(74) *Attorney, Agent, or Firm* — Blank Rome LLP

(57) ABSTRACT

A lamp that includes a lens, an electrode, and a sensing circuit connected to a light source. The lens is spaced apart from the sensing circuit. The forward facing surface of the lens has a sensing location. The electrode has a first portion opposite a second portion. The first portion is connected to the sensing circuit. The second portion is positioned alongside a backward facing surface of the lens. The electrode senses an electric field through the lens at the sensing location. The sensing circuit is configured to turn on the light source when the light source is turned off and the electrode senses the electric field. The sensing circuit is configured to turn off the light source when the light source is turned on and the electrode senses the electric field.

20 Claims, 17 Drawing Sheets

(56) References Cited

U.S. PATENT DOCUMENTS

2014/0268800 A1    9/2014   Castillo et al.
2016/0179260 A1    6/2016   Ham et al.
2016/0345430 A1   11/2016   Li et al.

* cited by examiner

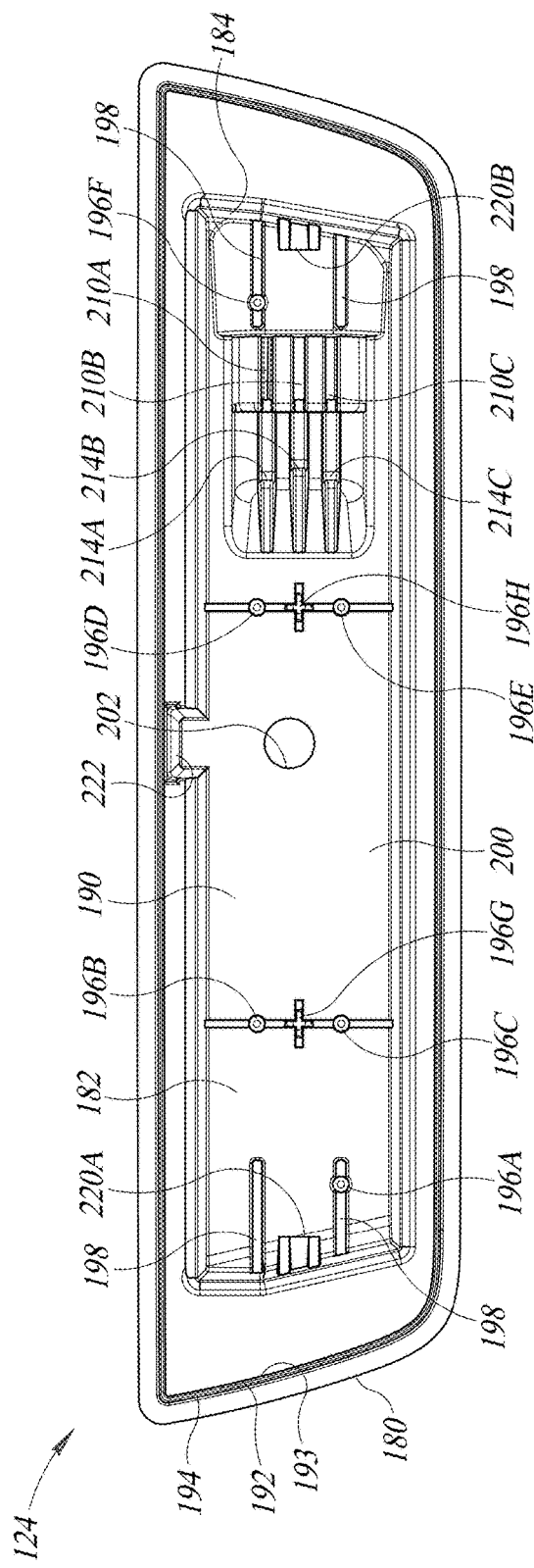
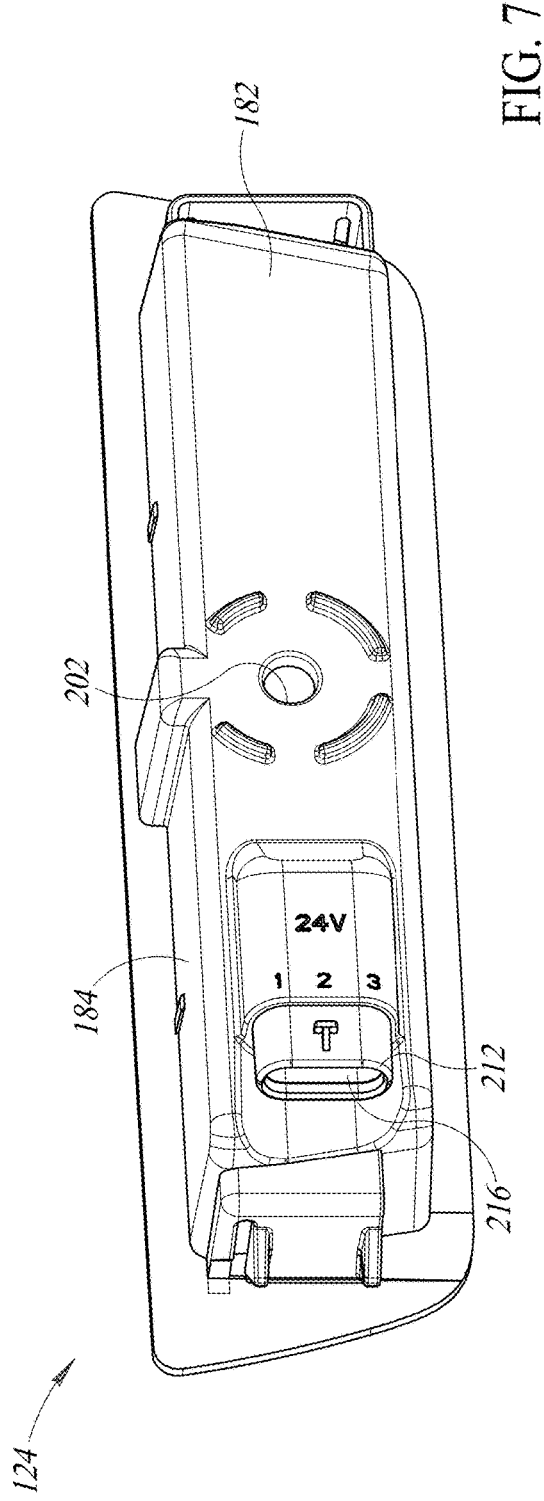
FIG. 6
FIG. 7

US 10,598,365 B2

PROXIMITY SENSOR SWITCHED AUTOMOTIVE LAMP COMPRISING AN ELECTRODE TO SENSE AN ELECTRIC FIELD THROUGH THE SENSING LOCATION FROM THE FACING SURFACE OF A LENS

BACKGROUND OF THE INVENTION

Field of the Invention

The present invention is directed generally toward vehicle lighting and more particularly toward interior automotive lamps operable by a human user (e.g., a driver, a passenger, and the like).

Description of the Related Art

Interior automotive lamps allow an occupant of a vehicle to see the inside of the passenger compartment when it is dark outside the vehicle. Unfortunately, such lamps are generally operated by mechanical switches that have many drawbacks. For example, mechanical switches require features (e.g., buttons) configured to be pressed or otherwise manually operated by the occupant of the vehicle. Implementing these features often requires that one or more openings be formed in the lamp. Unfortunately, such openings may allow materials (e.g., liquids and/or debris) to enter the lamp where such materials can interfere with the functioning of the lamp. Therefore, a need exists for a lamp configured to be operated without a mechanical switch. A lamp that does not include any openings through which liquids and/or debris may enter the lamp is particularly desirable. The present application provides these and other advantages as will be apparent from the following detailed description and accompanying figures.

BRIEF DESCRIPTION OF THE SEVERAL VIEWS OF THE DRAWING(S)

FIG. 6 is a front perspective view of a housing of the lamp of FIG. 1.

FIG. 7 is a rear perspective view of the housing of FIG. 6.

Like reference numerals have been used in the figures to identify like components.

DETAILED DESCRIPTION OF THE INVENTION

Capacitive proximity switches have been used for many years to provide a control interface for lamps, elevators, smart phones, and many other appliances. Capacitance switches offer advantages over mechanical switches. For example, capacitance switches may be more reliable (e.g., as measured by a number of on/off cycles until failure), have a smaller size, and allow the sensor to be triggered through solid membranes that are impermeable to liquids, dust, and other physical objects.

Figure 1:
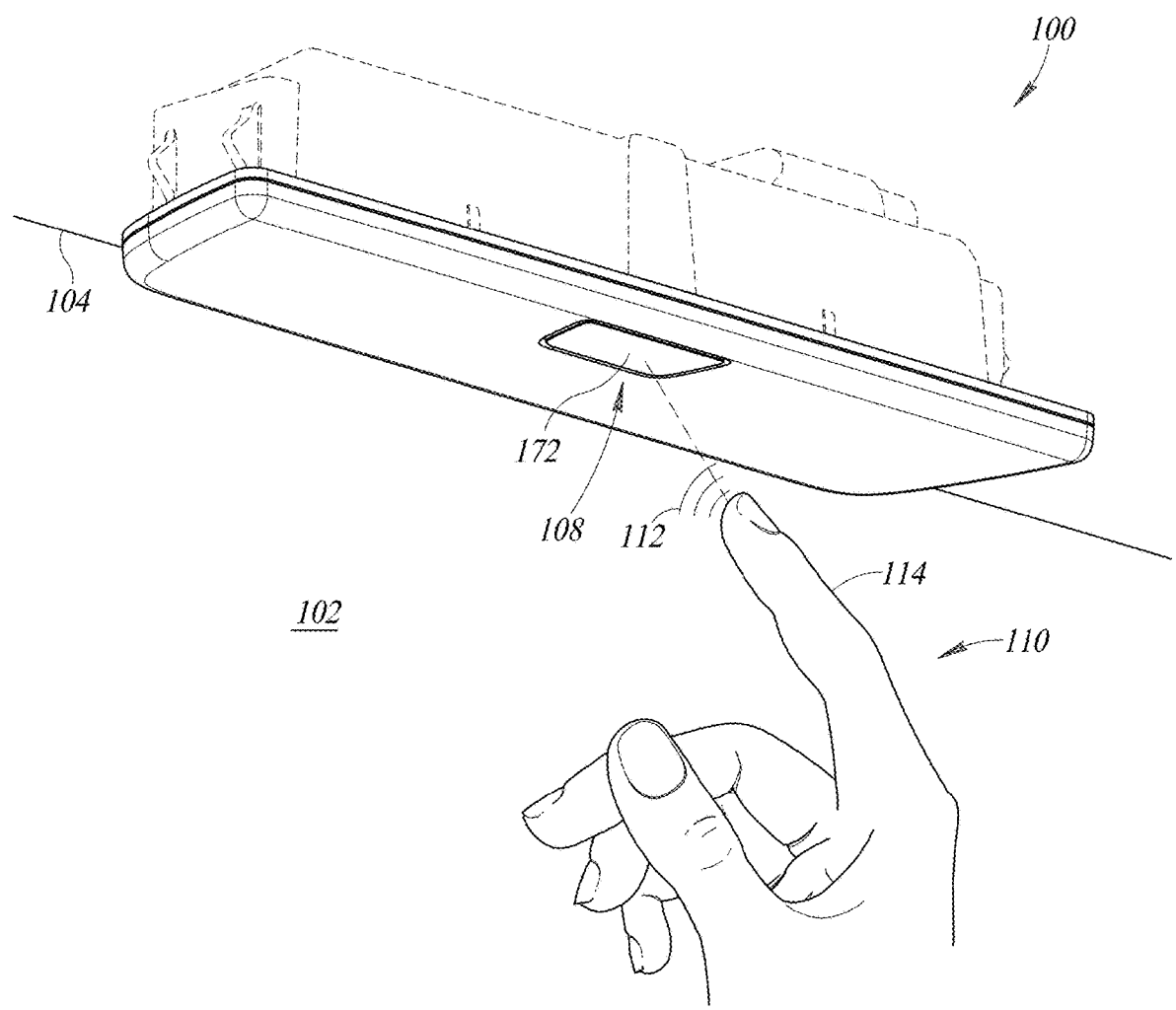
FIG. 1 is a perspective view of a lamp (with a capacitive proximity switch) installed in an interior space of a vehicle.

FIG. 1 depicts a light or lamp 100 configured to be installed in an interior space 102 (e.g., a passenger compartment, a trunk, and the like) of a vehicle 104 (e.g., a car, a truck, and the like). The lamp 100 includes a capacitive proximity switch 108 operable by a human user 110 (e.g., a driver, a passenger, and the like). The capacitive proximity switch 108 is configured to sense an electric field 112 (e.g., emitted by a finger 114 of the user 110). The capacitive proximity switch 108 operates the lamp 100 (e.g., toggles the lamp 100 on and off) when the capacitive proximity switch 108 senses the electric field 112. In other words, the lamp 100 is operated (turned on and off) without a mechanical switch or direct physical contact between the user 110 and components of a mechanical switch.

Figure 4:
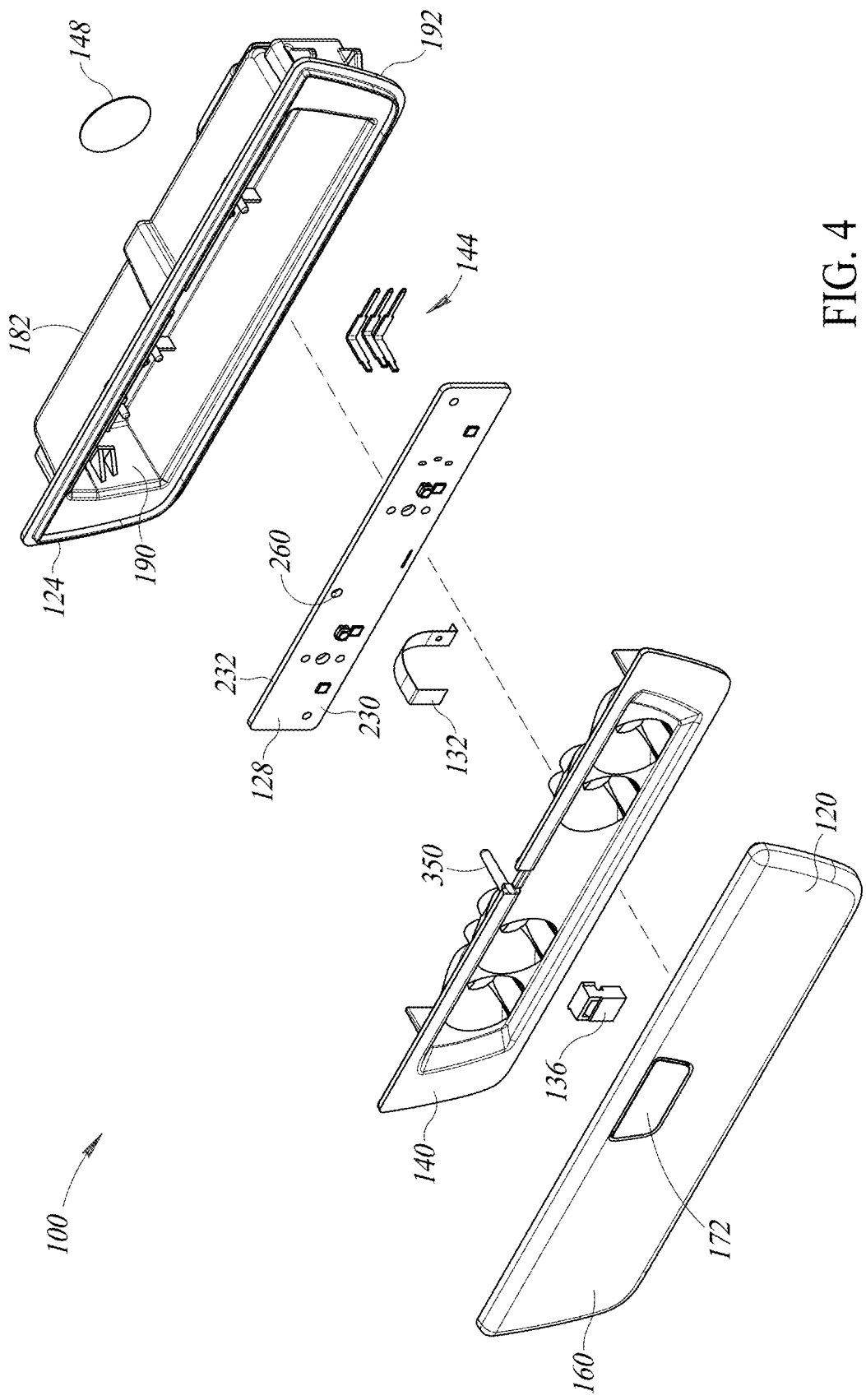
FIG. 4 is an exploded front perspective view of the lamp of FIG. 1.

Referring to FIG. 4, the lamp 100 includes a cover or lens 120, a housing 124, a substrate or printed circuit board ("PCB") 128, one or more electrodes 132, one or more support grommets 136, a reflector 140, a terminal set 144, and a vent patch 148. While the lamp 100 may include more than one electrode and/or more than one support grommet, for ease of illustration, the lamp 100 will be described as including the single electrode 132 and the single support grommet 136. However, through application of ordinary skill in the art to the present teachings, embodiments may be constructed that include two or more electrodes each like the electrode 132. In such embodiments, a different support grommet like the support grommet 136 may be provided for each of the electrodes.

Lens

Figure 2:
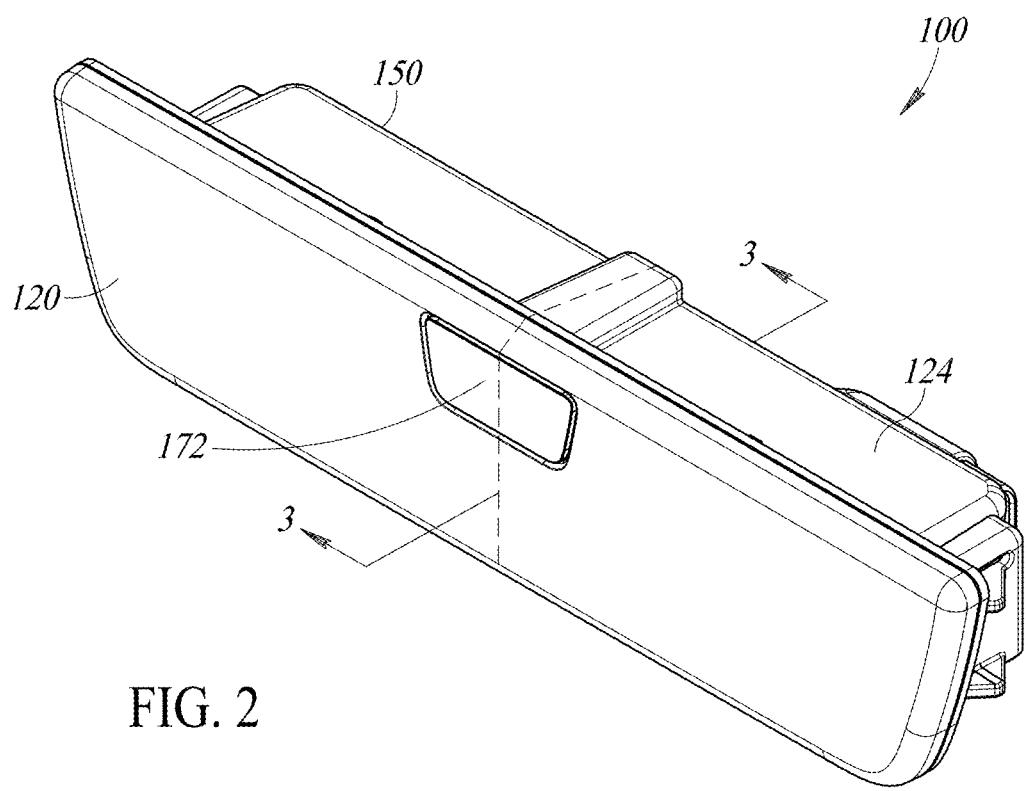
FIG. 2 is a front perspective view of the lamp of FIG. 1.
Figure 3:
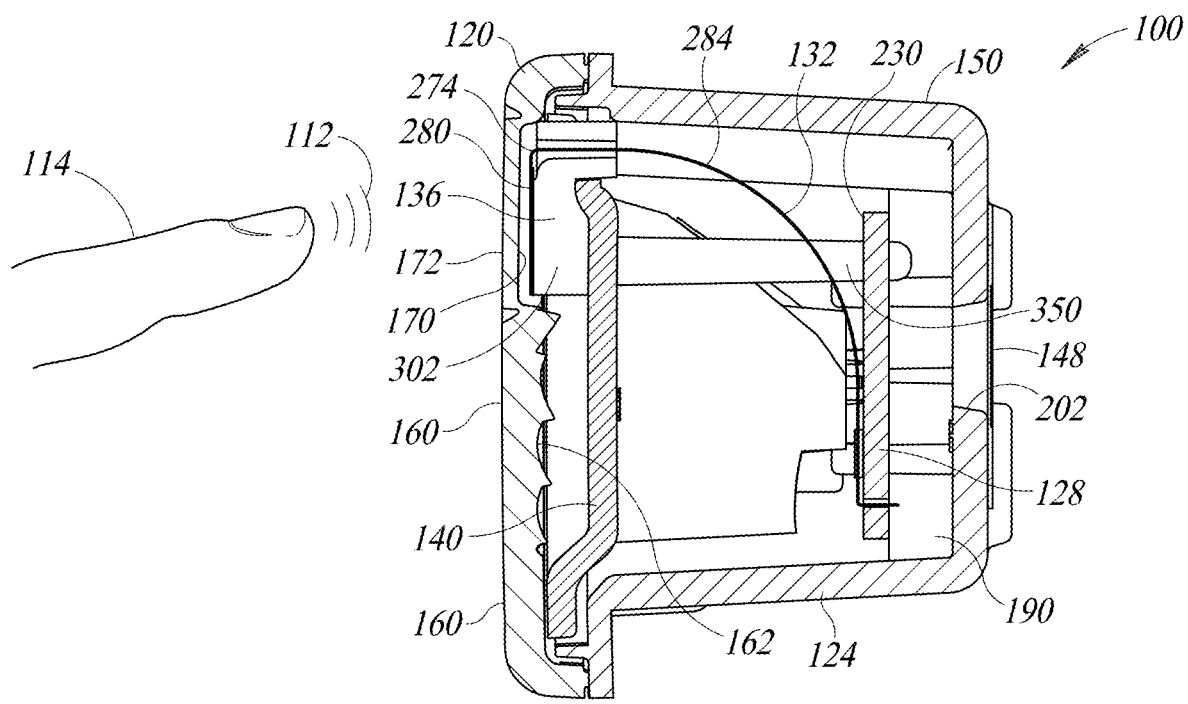
FIG. 3 is a cross-sectional view of the lamp taken through a line 3-3 depicted in FIG. 2.

Referring to FIGS. 2 and 3, the lens 120 is connected to the housing 124 to form an enclosure 150. Referring to FIG. 4, the enclosure 150 (see FIGS. 2 and 3) houses the PCB 128, the electrode 132, the support grommet 136, and the reflector 140. As will be described below, the terminal set 144 is mounted on the PCB 128 and extends outwardly therefrom through the housing 124.

Figure 5:
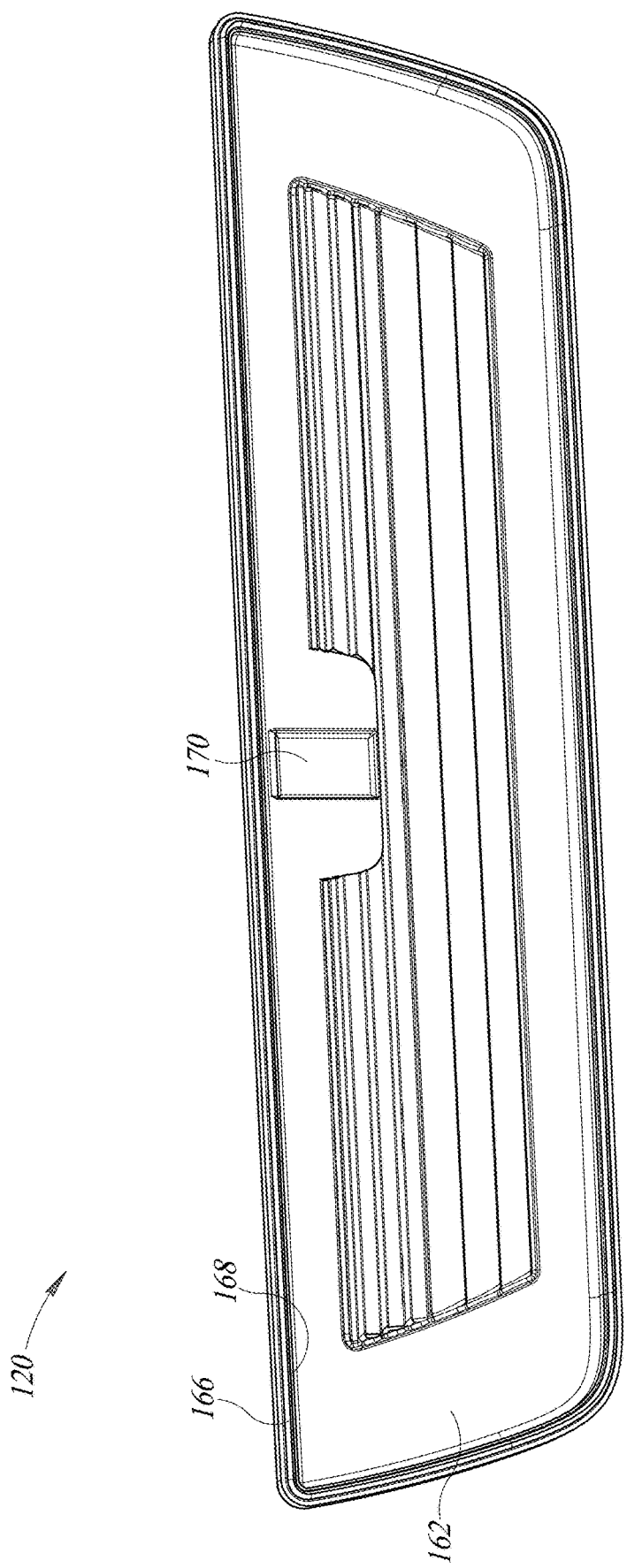
FIG. 5 is a rear perspective view of a lens of the lamp of FIG. 1.

The lens 120 is transparent and/or translucent and allows light to shine therethrough. Referring to FIG. 3, the lens 120 may have a generally planar front facing surface 160 opposite a back facing surface 162. Referring to FIG. 5, a rearward extending sidewall 166 may be formed along a periphery 168 of the back facing surface 162. A recess 170 may be formed in the back facing surface 162. Opposite the recess 170, referring to FIG. 4, the front facing surface 160 has a remote sensing location 172. In this context, the term "remote" refers to the position of the remote sensing location 172 with respect to the PCB 128.

Optionally, a label (e.g., a nameplate) may be positioned at or near the remote sensing location 172. The label (not shown) may indicate to the user 110 (see FIG. 1) where to touch the lens 120 to toggle the lamp 100 on or off.

The lens 120 may be constructed as a single continuous piece without any through-holes formed therein (not even at the remote sensing location 172). Thus, the lens 120 is impermeable to liquids, dust, and dirt. In contrast, a mechanical switch cannot include such a continuous covering. Additionally, the lack of through-holes in the lens 120 may provide an aesthetically pleasing appearance when compared to lamps that include buttons or other features of conventional mechanical switches.

Housing

Referring to FIG. 6, the housing 124 has an open front portion 180 connected to a closed rear portion 182 by a sidewall 184. The rear portion 182 and the sidewall 184 define a hollow interior 190 that is accessible through the open front portion 180. Referring to FIG. 4, the interior 190 is configured to house the PCB 128, the electrode 132, the support grommet 136, and the reflector 140. The terminal set 144 is mounted on the PCB 128 and extends outwardly therefrom through the rear portion 182 of the housing 124. The vent patch 148 is mounted on the housing 124.

Referring to FIG. 6, the front portion 180 has a forwardly extending sidewall 192 configured to be positioned inside the rearward extending sidewall 166 (see FIG. 5) of the lens 120 (see FIGS. 2-5 and 19). The sidewall 192 has an inwardly facing surface 193 opposite an outwardly facing surface 194. Friction between the sidewall 166 and the outwardly facing surface 194 of the sidewall 192 may form a friction fit between the lens 120 (see FIGS. 2-5 and 19) and the housing 124. Optionally, referring to FIG. 4, an adhesive may be used to attach the lens 120 to the housing 124. By way of another non-limiting example, the lens 120 may be attached to the housing 124 by sonic plastic welding or vibration welding. As described below, the lens 120 may be attached to the housing 124 as the last step, which allows the lamp 100 to be sealed making it watertight and/or dust-tight.

Referring to FIG. 6, inside the interior 190, the rear portion 182 includes one or more forwardly extending mounting pegs 196A-196H. The mounting pegs 196G and 196H may extend further forward than the mounting pegs 196A-196F. Optionally, the rear portion 182 may include one or more spacers 198 configured to space the PCB 128 (see FIGS. 3, 4, 9, 15, and 16) apart from an inside surface 200 of the rear portion 182. The rear portion 182 may include one or more vent holes 202. The vent patch 148 (see FIGS. 3 and 4) is configured to cover the vent hole(s) 202.

The rear portion 182 includes one or more through-channels 210A-210C and one or more stop walls 214A-214C. The stop wall(s) 214A-214C are aligned with the through-channel(s) 210A-210C, respectively. In the embodiment illustrated in FIG. 8, the through-channel(s) 210A-210C each extend through the inside surface 200 (see FIG. 6) and into a connector 212 formed in the rear portion 182. The connector 212 has an opening 216 configured to receive an electrical connector (not shown). Power may be supplied to the lamp 100 by the electrical connector (not shown). The electrical connector (not shown) may be configured to form a seal with the connector 212 that prevents materials (e.g., liquids and/or debris) from entering the interior 190 (see FIGS. 3, 4, 6, 16, and 17) through the through-channel(s) 210A-210C. The electrical connector (not shown) may be connected to cable (not shown) that is connected to a system (not shown) within the vehicle 104 (see FIG. 1).

Referring to FIG. 6, reflector mounting tabs 220A and 220B extend inwardly from the sidewall 184. The reflector mounting tabs 220A and 220B are opposite one another across the interior 190. Optionally, the sidewall 184 may include a channel 222 that extends along the interior 190 from the rear portion 182 to the front portion 180.

PCB

Figure 8:
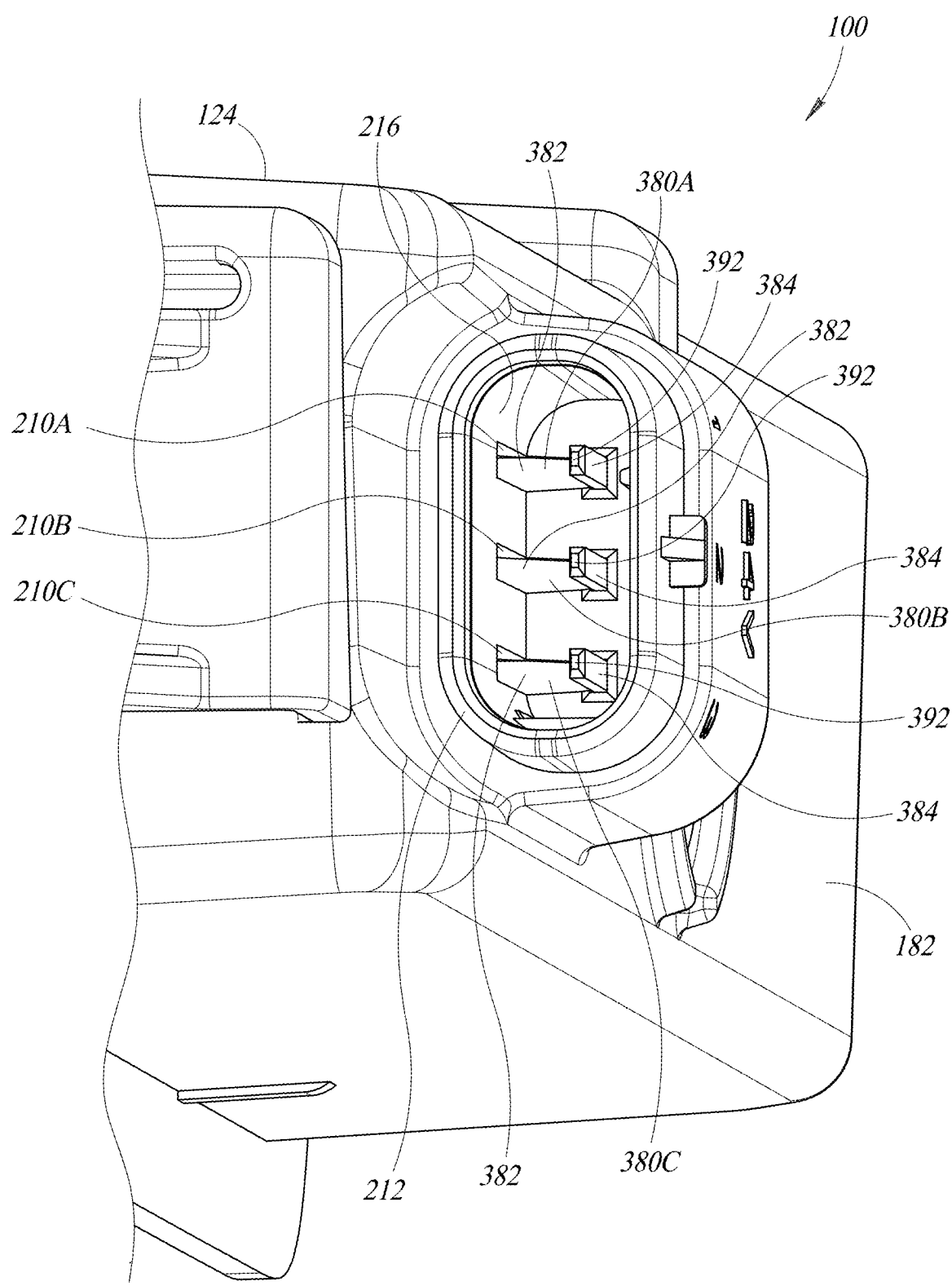
FIG. 8 is a partial side perspective view of the lamp of FIG. 1.
Figure 9:
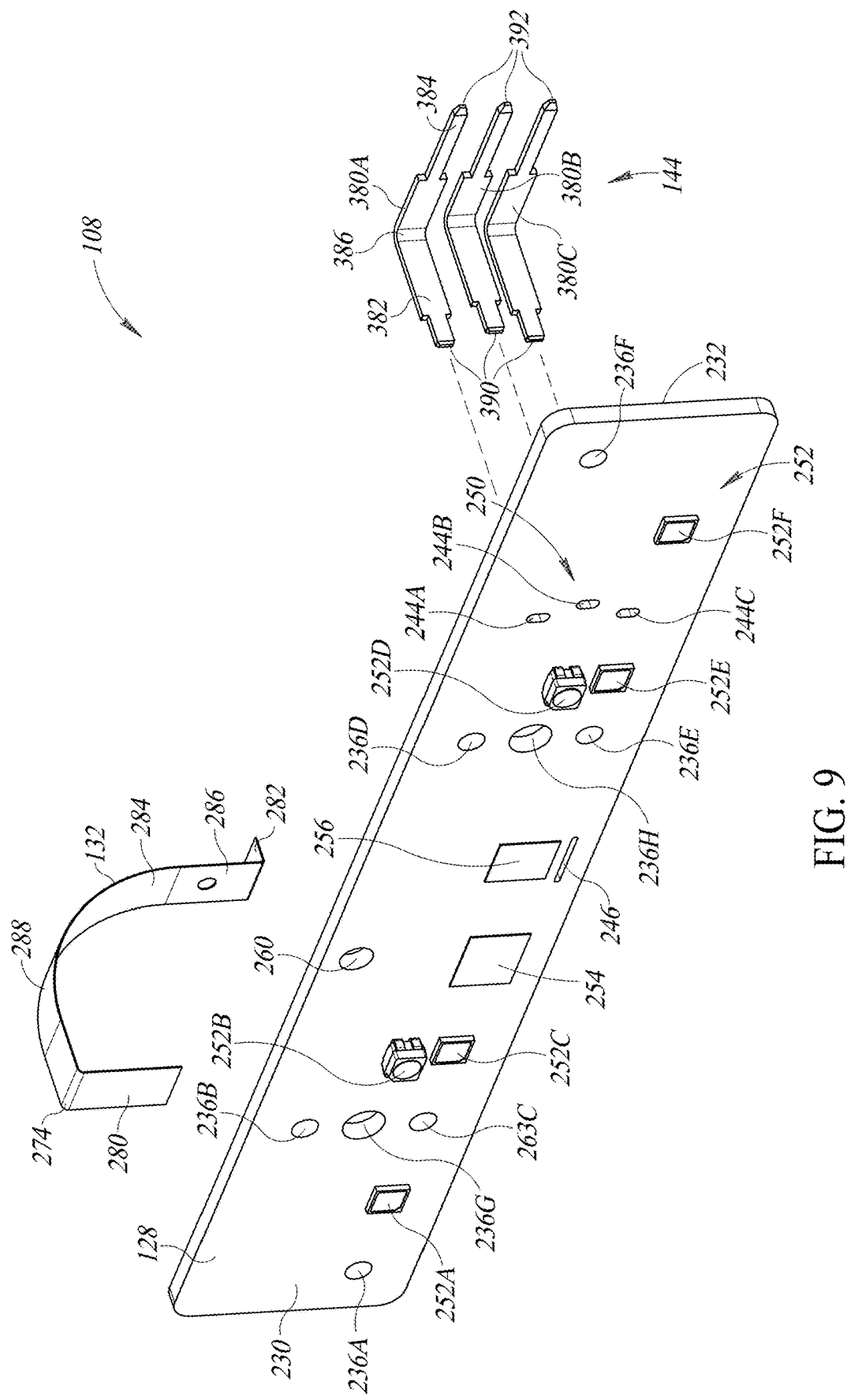
FIG. 9 is an exploded front perspective view of the capacitive proximity switch of the lamp of FIG. 1.

Referring to FIG. 9, the PCB 128 has a forward facing side 230 opposite a rear facing side 232. The PCB 128 includes one or more mounting through-holes 236A-236H. The mounting through-hole(s) 236A-236H are configured to receive the forwardly extending mounting peg(s) 196A-196H (see FIGS. 6 and 16), respectively, of the housing 124 (see FIGS. 2-4, 6-8, and 16-20). The mounting peg(s) 196A-196H (see FIGS. 6 and 16) are configured to extend from the rear facing side 232 through the mounting through-holes 236A-236H, respectively. The mounting peg(s) 196A-196F (see FIGS. 6 and 16) may be heat-staked to the PCB 128. Thus, the PCB 128 may be non-removably attached to the housing 124 (see FIGS. 2-4, 6-8, and 16-20). The mounting peg(s) 196G and 196H (see FIGS. 6 and 16) may be longer than the mounting peg(s) 196A-196F (see FIGS. 6 and 16) and may extend forwardly beyond the forward facing side 230 of the PCB 128.

The PCB 128 includes plated through-holes 244A-244C configured to receive the terminal set 144 and form an electrical connection with the terminal set 144. One or more electrical circuits 250 are mounted on the PCB 128 and connected to the plated through-holes 244A-244C. The terminal set 144 provides power to the circuit(s) 250 via the plated through-holes 244A-244C.

The PCB 128 includes a through-hole or slot 246 configured to receive the electrode 132. Thus, the electrode 132 is configured to be physically inserted into the through-slot 246. Optionally, the through-slot 246 may be plated. In such embodiments, the plated through-slot 246 may be connected to the circuit(s) 250 and forms an electrical connection between the electrode 132 and the circuit(s) 250. Alternatively, the PCB 128 may include an electrically conductive contact or solder pad 256 configured to be soldered to the electrode 132. In such embodiments, the solder pad 256 is connected to the circuit(s) 250 and forms an electrical connection between the electrode 132 and the circuit(s) 250.

The circuit(s) 250 include(s) or is/are connected to one or more light sources 252. In the embodiment illustrated, the light source(s) 252 has/have been implemented as six separate light emitting diodes ("LEDs") 252A-252F mounted on the forward facing side 230 of the PCB 128. The light source(s) 252 is/are positioned to face forwardly so that the light generated by the light source(s) 252 shines forwardly through the lens 120 (see FIGS. 2-5 and 19).

The circuit(s) 250 include(s) a microprocessor 254 connected to the light source(s) 252 by conductors (not shown). By way of a non-limiting example, the conductors (not shown) may be implemented as conventional surface mounted traces. The microprocessor 254 may be implemented as control chip. The electrode 132 is configured to conduct a conductive signal to the circuit(s) 250 when the electric field 112 (see FIGS. 1 and 3) is at or near the remote sensing location 172 (see FIGS. 1-4 and 19). The circuit(s) 250 is/are configured to conduct the capacitive signal between the electrode 132 and the microprocessor 254. The microprocessor 254 is configured to detect when the capacitive signal indicates the user 110 (see FIG. 1) is touching the remote sensing location 172 (see FIGS. 1-4 and 19). The microprocessor 254 is configured to turn on the light source(s) 252 when the light source(s) 252 are off and the microprocessor 254 determines the user 110 (see FIG. 1) is touching the remote sensing location 172 (see FIGS. 1-4 and 19). The microprocessor 254 is configured to turn off the light source(s) 252 when the light source(s) 252 are on and the microprocessor 254 determines the user 110 (see FIG. 1) is touching the remote sensing location 172 (see FIGS. 1-4 and 19). In other words, the microprocessor 254 is configured to toggle the light source(s) 252 on and off.

Referring to FIG. 3, the electrode 132 transmits the capacitive signal sensed by its sensing portion 280 at the remote sensing location 172 to the microprocessor 254 inside the lamp 100. Thus, referring to FIG. 9, the capacitive proximity switch 108 includes the electrode 132, the circuit(s) 250, and the terminal set 144.

Optionally, the PCB 128 may include one or more reflector mounting through-holes 260.

Electrode

Figure 10:
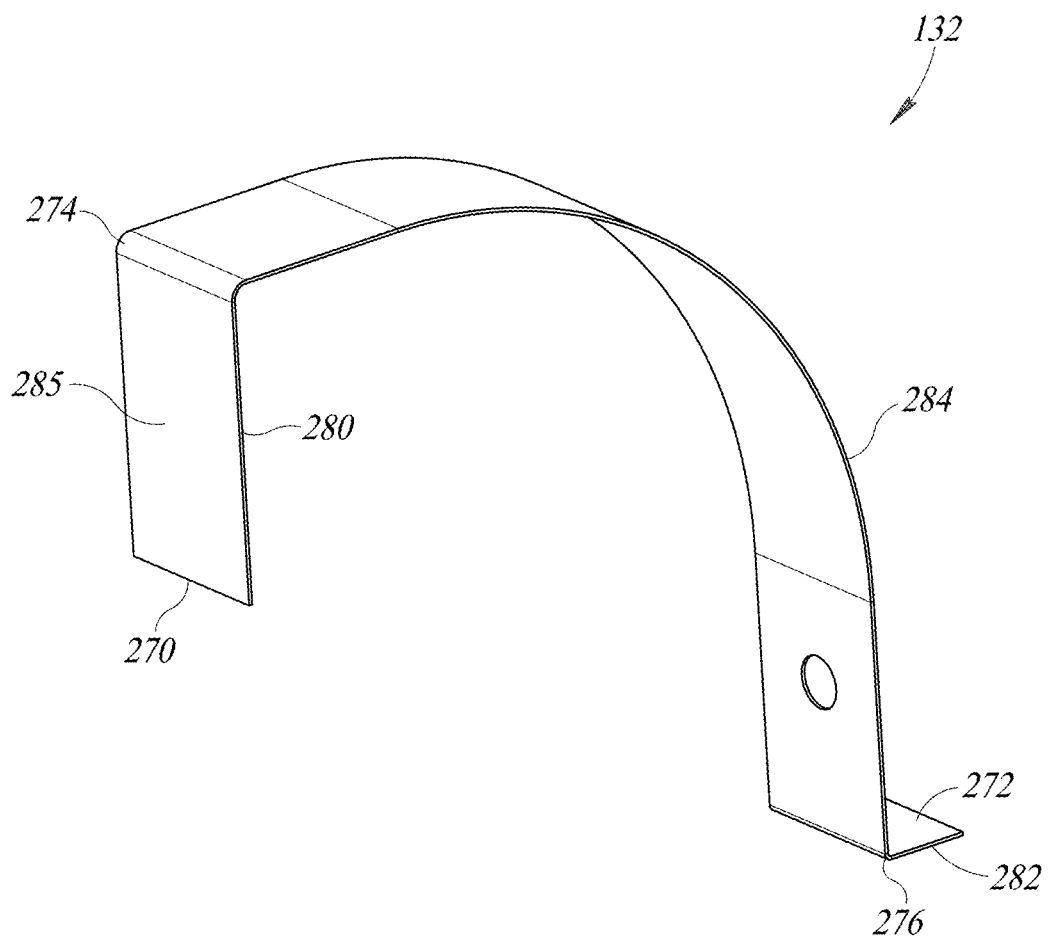
FIG. 10 is a side perspective view of an electrode of the lamp of FIG. 1.

The electrode 132 provides a conductive pathway between the remote sensing location 172 (see FIGS. 1-4 and 19) and the circuit(s) 250. Referring to FIG. 10, the electrode 132 includes a first end 270 opposite a second end 272. In the embodiment illustrated, the electrode 132 includes first and second bends 274 and 276. The first bend 274 defines a sensing portion 280 that extends from the first end 270 to the first bend 274. The second bend 276 defines an anchor portion 282 that extends from the second end 272 to the second bend 276. An intermediate portion 284 extends between the first and second bends 274 and 276.

Referring to FIG. 3, the intermediate portion 284 is configured to pass through the support grommet 136 and position the sensing portion 280 inside the recess 170 formed in the back facing surface 162 of the lens 120. The lens 120 protects the sensing portion 280, which is sensitive to the electric field 112 (e.g., generated by the finger 114) in its vicinity. Because the sensing portion 280 is positioned behind the lens 120, the lamp 100 may be sealed and may not contain through-holes through which materials (e.g., liquids and/or debris) may enter the interior 190 of the housing 124 and potentially damage internal components of the lamp 100.

Referring to FIG. 10, the sensing portion 280 has a front facing surface 285 with a surface area configured such that the electric field 112 (see FIGS. 1 and 3) of the finger 114 (see FIGS. 1 and 3) may induce the capacitive signal in the electrode 132. The electrode 132 conducts the capacitive signal to the circuit(s) 250 (see FIGS. 9 and 15). By way of a non-limiting example, the surface area of the sensing portion 280 may be 15 mm² to 50 mm². Referring to FIG. 3, the thickness of the lens 120 at the recess 170 (which is opposite the remote sensing location 172) is configured to allow the electric field 112 (e.g., emitted by the finger 114) to adequately and consistently induce the capacitive signal in the electrode 132.

Referring to FIG. 9, the anchor portion 282 of the electrode 132 is configured to be inserted inside the through-slot 246 of the PCB 128. Referring to FIG. 3, the intermediate portion 284 is configured to extend away from the forward facing side 230 of the PCB 128 toward the remote sensing location 172. The intermediate portion 284 may extend through the channel 222 (see FIGS. 6 and 16) formed in the housing 124. Optionally, referring to FIG. 9, a contact portion 286 of the intermediate portion 284 adjacent the anchor portion 282 may extend along the PCB 128 and be attached (e.g., soldered) thereto. For example, the contact portion 286 may be soldered to the solder pad 256 and form an electrical connection therewith. In the embodiment illustrated, the intermediate portion 284 includes a curved portion 288 that extends from the contact portion 286 to the first bend 274.

The electrode 132 may be constructed from metal that is easy to solder to the solder pad 256. For example, the electrode 132 may be constructed from thin (e.g., less than 0.15 mm) and flexible metal (e.g., brass, bronze, and the like). Referring to FIG. 3, the electrode 132 may be plated with a material (e.g., tin) that facilitates soldering.

Support Grommet

Referring to FIG. 3, the support grommet 136 guides and holds the electrode 132 as the electrode 132 passes through the reflector 140. The support grommet 136 may be constructed from an electrically non-conductive material (e.g., silicon rubber) and the reflector 140 may be constructed from an electrically conductive material (e.g., metal). Thus, the support grommet 136 may insulate the electrode 132 from the reflector 140.

The sensing portion 280 of the electrode 132 is sandwiched between the support grommet 136 and the lens 120. Elastic pressure provided by the support grommet 136, biases the sensing portion 280 of the electrode 132 against the lens 120. In other words, the support grommet 136 presses the electrode 132 against the lens 120 and provides secure positioning of the electrode 132 with respect to the lens 120.

Figure 11:
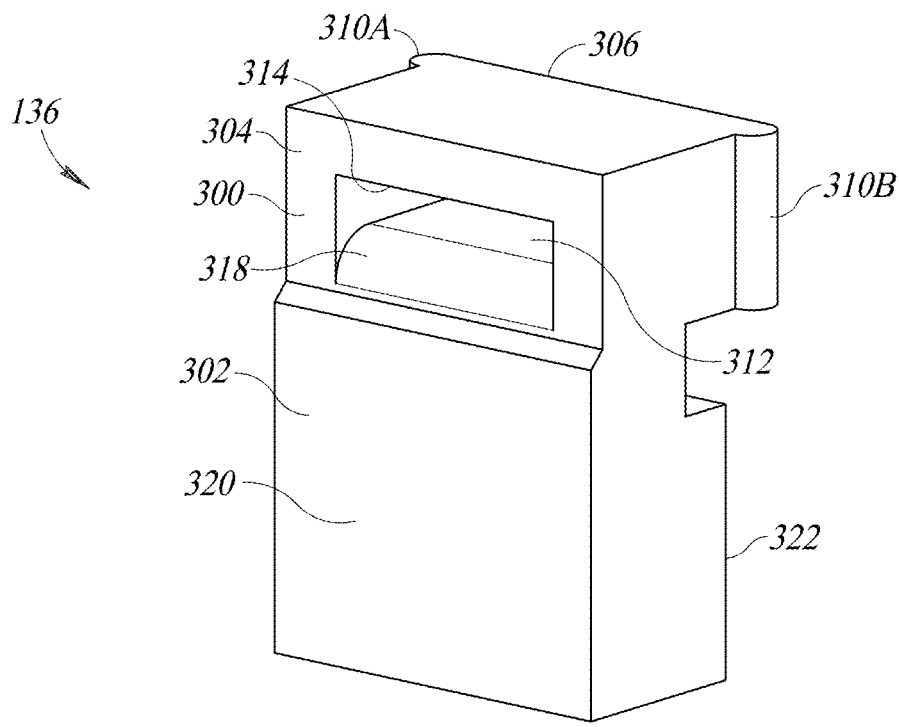
FIG. 11 is a front perspective view of a support grommet of the lamp of FIG. 1.
Figure 12:
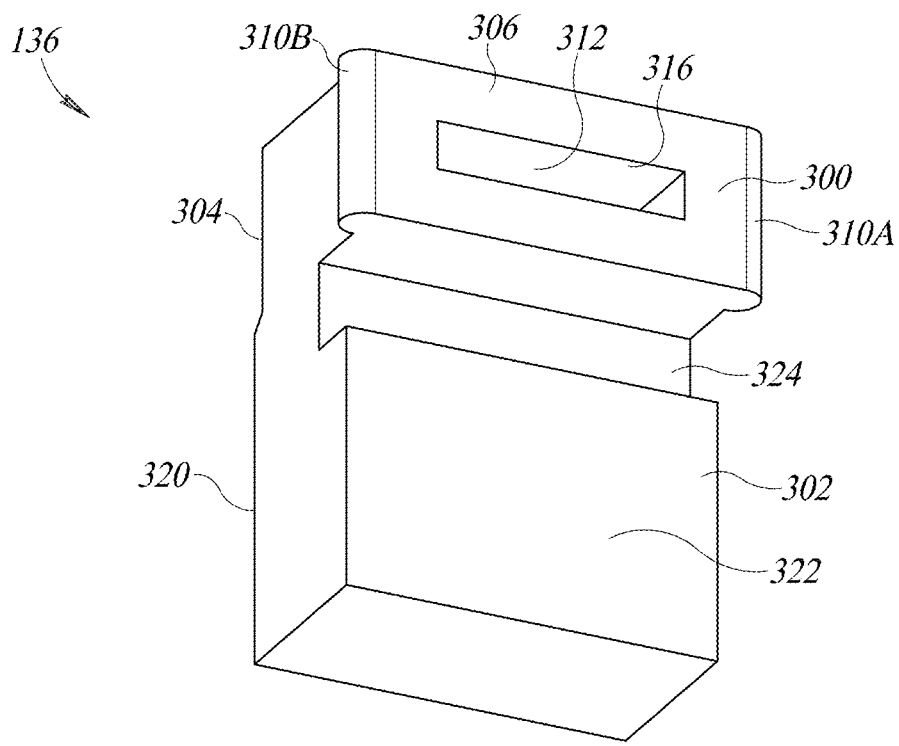
FIG. 12 is a rear perspective view of the support grommet of FIG. 11.

Referring to FIGS. 11 and 12, the support grommet 136 has a channel portion 300 connected to a spacer portion 302. The channel portion 300 has a front portion 304 opposite a rear portion 306. The front portion 304 may be offset rearwardly with respect to the spacer portion 302. The rear portion 306 includes first and second outwardly extending stop walls 310A and 310B configured to help prevent the channel portion 300 from moving forwardly with respect to the reflector 140 (see FIGS. 3, 4, 13, 14, and 17-20).

The channel portion 300 has a through-channel 312 configured to allow the intermediate portion 284 (see FIGS. 3, 9, and 10) of the electrode 132 (see FIGS. 3, 4, 9, 10, and 20) to pass therethrough. The channel portion 300 extends from a front opening 314 (see FIG. 11) formed in the front portion 304 to a rear opening 316 (see FIG. 12) formed in the rear portion 306. The front opening 314 (see FIG. 11) may be larger than the rear opening 316 (see FIG. 12). Thus, the through-channel 312 may be tapered. Referring to FIG.

11, a curved edge portion 318 may be formed at an intersection of a lower portion of the front opening 314 and the front portion 304.

Referring to FIGS. 11 and 12, the spacer portion 302 has a front facing surface 320 opposite a rear facing surface 322. Referring to FIG. 3, the sensing portion 280 of the electrode 132 is positioned against the front facing surface 320 (see FIGS. 11 and 12). The spacer portion 302 is compressible between the sensing portion 280 and the reflector 140. The spacer portion 302 biases the sensing portion 280 against the lens 120. In the embodiment illustrated, the first bend 274 may be substantially 90 degrees. Thus, referring to FIG. 11, the through-channel 312 may extend at approximately 90 degrees with respect to the front facing surface 320.

Optionally, referring to FIG. 12, the rear facing surface 322 of the spacer portion 302 may include a recess 324 positioned adjacent the channel portion 300. However, this is not a requirement.

Reflector

Figure 13:
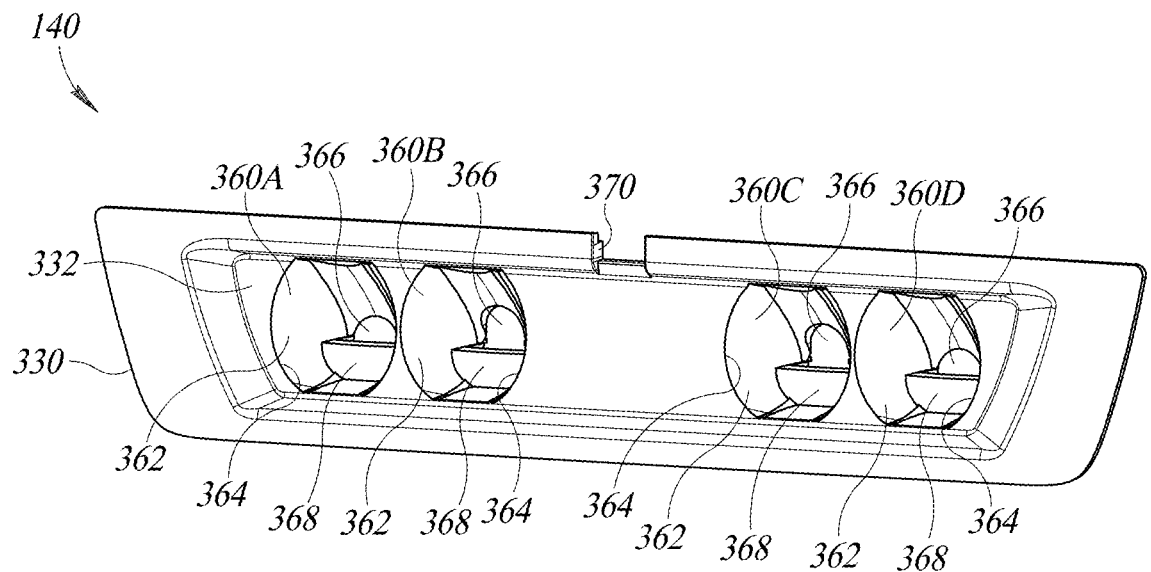
FIG. 13 is a front perspective view of a reflector of the lamp of FIG. 1.
Figure 17:
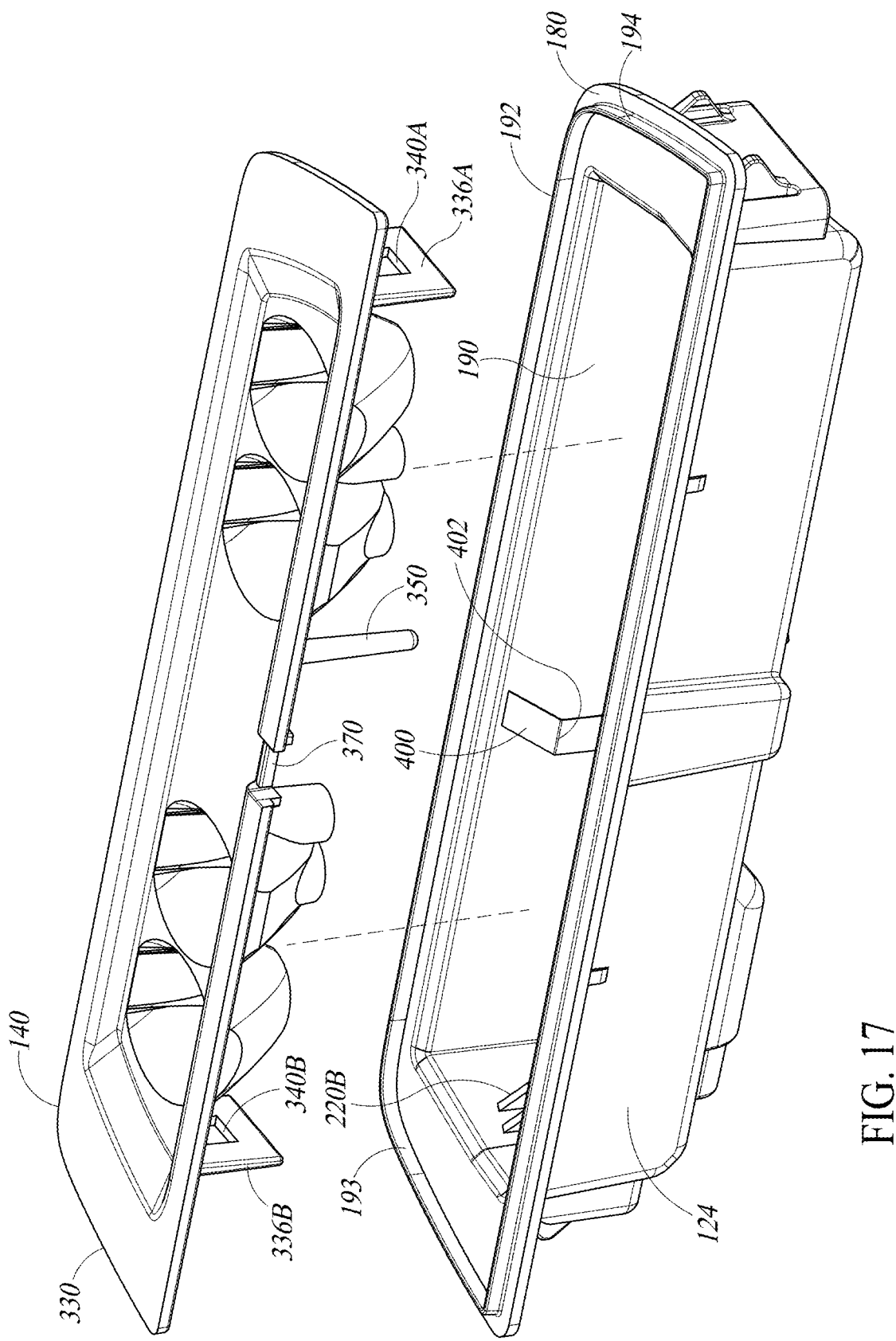
FIG. 17 is a top perspective view of the reflector being inserted into the housing of the lamp of FIG. 1.

Referring to FIG. 3, the reflector 140 is mounted inside the interior 190 between the lens 120 and the PCB 128. Referring to FIG. 13, in the embodiment illustrated, the reflector 140 has a peripheral portion 330 framing a recessed portion 332. Referring to FIG. 17, the peripheral portion 330 is configured to be positioned adjacent the inwardly facing surface 193 of the sidewall 192 of the housing 124.

Figure 14:
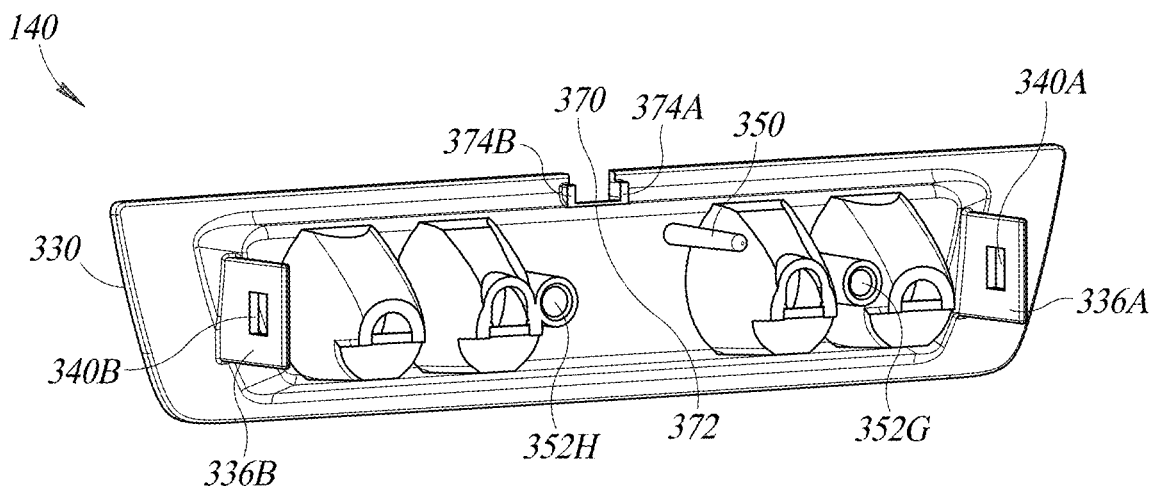
FIG. 14 is a rear perspective view of the reflector of FIG. 13.

Referring to FIG. 14, in the embodiment illustrated, the reflector 140 has rearwardly extending first and second arms 336A and 336B. The first arm 336A has a first recess or through-hole 340A configured to receive the first tab 220A (see FIGS. 6 and 16) and the second arm 336B has a second recess or through-hole 340B configured to receive the second tab 220B (see FIGS. 6, 16, and 17). Referring to FIG. 17, when the tabs 220A (see FIGS. 6 and 16) and 220B are received inside the through-holes 340A and 340B, respectively, the reflector 140 may be characterized as being snapped into the housing 124.

Referring to FIG. 4, the reflector 140 has one or more rearwardly extending mounting projections 350 each configured to be received inside the one of the reflector mounting through-hole(s) 260 (see FIGS. 4 and 9) of the PCB 128. The reflector 140 has rearwardly opening apertures 352G and 352H (see FIG. 14) configured to receive the mounting pegs 196G and 196H (see FIGS. 6 and 16), respectively, of the housing 124 after the mounting pegs 196G and 196H have passed through the mounting through-holes 236G and 236H (see FIG. 9), respectively, of the PCB 128.

Referring to FIG. 13, the reflector 140 has one or more light reflecting portions 360A-360D each having a reflective sidewall 362 that extends between front and a rear openings 364 and 366. The front opening(s) 364 are positioned within the recessed portion 332. Each of the light reflecting portion(s) 360A-360D is positioned such that at least one of the light source(s) 252 (see FIGS. 9 and 15) shines light through the rear opening 366 and onto the reflective sidewall 362. In the embodiment illustrated, the LED 252A (see FIG. 9) shines light into the rear opening 366 of the light reflecting portion 360A, the LEDs 252B and 252C (see FIG. 9) shine light into the rear opening 366 of the light reflecting portion 360B, the LEDs 252D and 252E (see FIG. 9) shine light into the rear opening 366 of the light reflecting portion 360C, and the LED 252F (see FIG. 9) shines light into the rear opening 366 of the light reflecting portion 360D. The reflective sidewalls 362 of the light reflecting portions 360A-360D reflect the light forwardly and out through the lens 120 (see FIGS. 2-5 and 19). The reflective sidewalls 362 of the light reflecting portions 360A-360D may collimate or otherwise direct the light generated by the light source(s) 252 (see FIGS. 9 and 15) in a desired direction. In the embodiment illustrated, in each of the light reflecting portions 360A-360D, a reflective wall 368 extends from the reflective sidewall 362 and into the path of the light generated by one or more of the light source(s) 252 (see FIGS. 9 and 15). The reflective wall 368 is configured to help direct the light in the desired direction.

Figure 18:
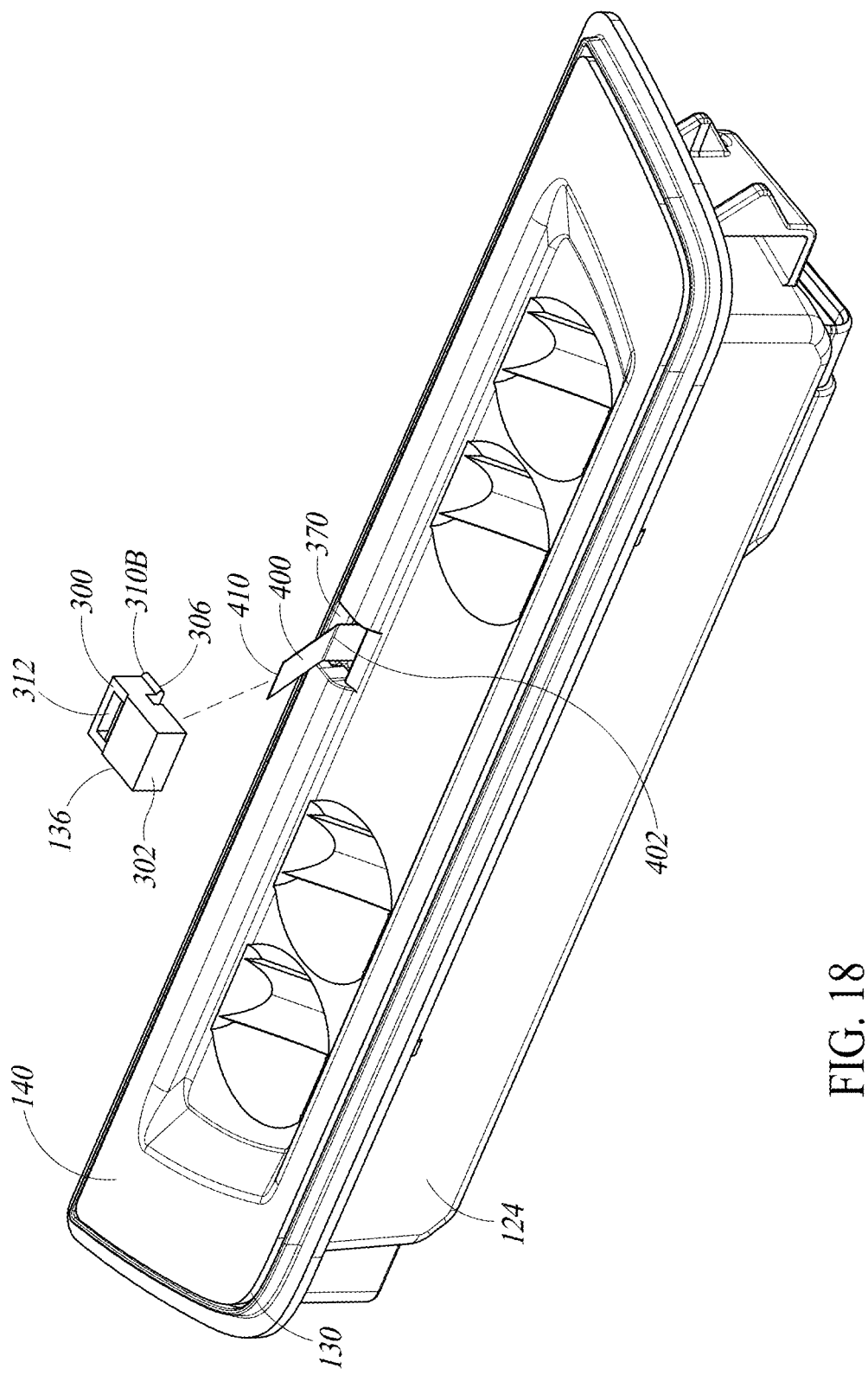
FIG. 18 is a bottom perspective view of the strip being inserted into the support grommet of the lamp of FIG. 1.

Referring to FIG. 18, the peripheral portion 330 of the reflector 140 includes a notch or opening 370 in which the channel portion 300 of the support grommet 136 may be mounted. Referring to FIG. 14, one or more sidewalls 372 may extend rearwardly alongside the opening 370. In the embodiment illustrated, the sidewall(s) 372 include first and second sidewall portions 374A and 374B that extend along opposite sides of the opening 370. The first and second sidewall portions 374A and 374B may help maintain the support grommet 136 (see FIGS. 3, 4, 11, 12, and 18-20) inside the opening 370. Referring to FIG. 12, the first and second stop walls 310A and 310B of the channel portion 300 of the support grommet 136 are configured to abut the first and second sidewall portions 374A and 374B (see FIG. 14), respectively, and help prevent the channel portion 300 from moving forwardly with respect to the reflector 140 (see FIGS. 3, 4, 13, 14, and 17-20).

Terminal Set

Referring to FIG. 9, the terminal set 144 includes two or more pins or contacts 380A-380C. In the embodiment illustrated, the terminal set 144 includes the three substantially identical contacts 380A-380C. One of the contacts 380A-380C may be configured to deliver power to the circuit(s) 250, another of the contacts 380A-380C may be a ground, and the last of the contacts 380A-380C may provide output information to the vehicle 104 (see FIG. 1). For example, the last contact may indicate whether the lamp 100 is on or off. The microprocessor 254 may provide the output information to the last contact.

In the embodiment illustrated, each of the contacts 380A-380C is generally L-shaped. Thus, the contacts 380A-380C each have first and second legs 382 and 384 connected together by a bent portion 386. Opposite the bent portion 386, the first leg 382 has a first free end 390. Opposite the bent portion 386, the second leg 384 has a second free end 392.

The first legs 382 of the contacts 380A-380C are configured to extend forwardly toward the PCB 128 along the stop walls 214A-214C (see FIG. 6), respectively. The first free ends 390 of the contacts 380A-380C are configured to be received inside the plated through-holes 244A-244C, respectively, and to form an electrical connection therewith. Referring to FIG. 8, the first legs 382 of the contacts 380A-380C are configured to extend through the through-channels 210A-210C, respectively, to position the second legs 384 inside the connector 212. Thus, the second free ends 392 of the contacts 380A-380C are positioned with the connector 212. The connector 212 is configured receive the electrical connector (e.g., a plug), which receives the second free ends 392 of the contacts 380A-380C and forms an electrical connection therewith. The electrical connector (not shown) may be configured to form a seal with the connector 212 that prevents materials (e.g., liquids and/or debris) from entering the interior 190 (see FIGS. 3, 4, 6, 16, and 17) through the through-channel(s) 210A-210C. As mentioned above, the electrical connector (not shown) may be connected (e.g., via a wire) to a circuit (not shown) inside the vehicle 104 (see FIG. 1). The circuit (not shown) in the vehicle 104 (see FIG. 1) may include a processor (not shown) configured to receive the indication from the last contact.

Vent Patch

Referring to FIG. 4, as mentioned above, the vent patch 148 is configured to cover the vent hole(s) 202 (see FIGS. 3, 6, and 7) formed in the rear portion 182 of the housing 124. In the embodiment illustrated, the vent patch 148 is generally disk shaped. However, this is not a requirement. The vent patch 148 may be attached to the rear portion 182 by an adhesive. The vent patch 148 may be constructed from polytetrafluoroethylene ("PTFE") or polyolefin.

Method

Figure 15:
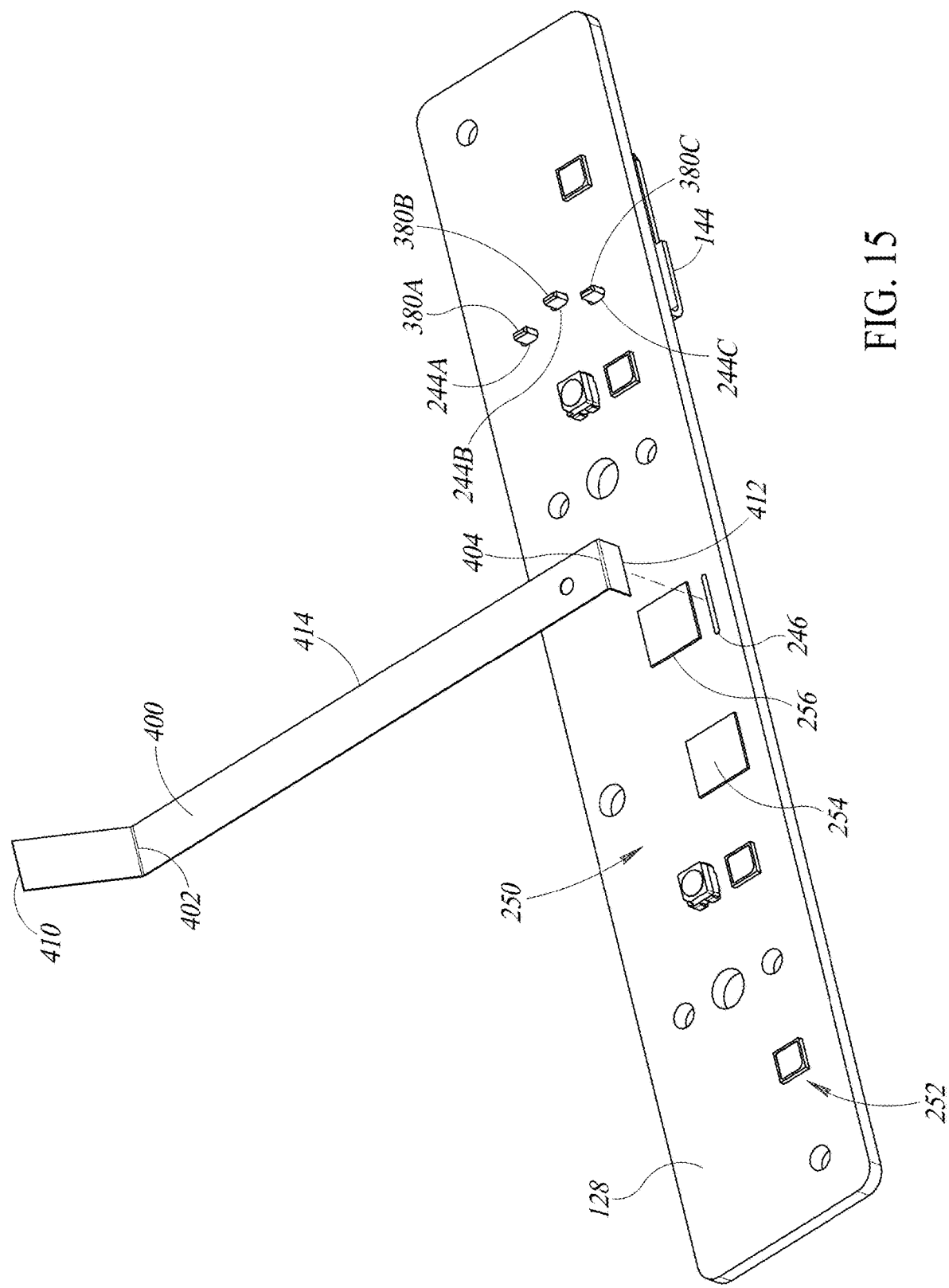
FIG. 15 is a partially exploded perspective view of a pre-bent strip used to construct the electrode and a printed circuit board of the lamp of FIG. 1.

FIGS. 15-19 illustrate a method of constructing the lamp 100. Referring to FIG. 15, the electrode 132 (see FIGS. 3, 4, 9, 10, and 20) may be constructed from a strip 400 (e.g., of metal). The strip 400 may be at least somewhat malleable so that when the strip 400 is deformed past its elastic deformation limit, the strip 400 remains bent. The strip 400 may have a simple shape (e.g., flat, straight, and rectangular) which enables easy, low cost manufacture compared to other more complex shapes and/or materials (e.g., a flex circuit).

Before assembly begins, first and second bends 402 and 404 may be formed in the strip 400. Thus, the strip 400 may be characterized as being pre-bent, which allows the bends 402 and 404 to be formed more accurately and faster (e.g., using hand operated jigs or automated machinery) than they could be formed during assembly. As shown in FIG. 15, the first bend 402 may have a smaller outside angle (e.g., at least 30 degrees with respect to flat) than the first bend 274 (see FIGS. 3, 9, 10, and 20) of the electrode 132 (see FIGS. 3, 4, 9, 10, and 20). By way of non-limiting examples, the first bend 274 (see FIGS. 3, 9, 10, and 20) may have an outside angle of approximately 90 degrees with respect to flat and the inside angle of the first bend 402 may be at least 30 degrees with respect to flat. Thus, the first bend 402 of the strip 400 may be bent into the first bend 274 during the assembly process. The second bend 404 may have an outside angle of approximately 90 degrees with respect to flat. The second bend 404 is identical to the second bend 276 (see FIG. 10) of the electrode 132 (see FIGS. 3, 4, 9, 10, and 20).

The strip 400 has a first end 410 connected to a second end 412 by an intermediate portion 414. After the first and second bends 402 and 404 are formed, the first end 410 is inserted into the through-slot 246 of the PCB 128. The second bend 404 prevents the intermediate portion 414 from slipping into or through the through-slot 246. The second bend 404 positions the intermediate portion 414 against the PCB 128 and into contact with the solder pad 256 to form an electrical connection therewith. Next, the intermediate portion 414 may be soldered to the solder pad 256. The intermediate portion 414 may be soldered directly to the solder pad 256 without requiring a special connector of the type required to form a connection with a flex circuit. Thus, the electrode 132 (see FIGS. 3, 4, 9, 10, and 20) may be less expensive to implement and easier to connect to the PCB 128 than a flex circuit. The contacts 380A-380C of the terminal set 144 may be inserted into the plated through-holes 244A-244C, respectively, before or after the first end 410 is inserted into the through-slot 246 of the PCB 128. Optionally, the contacts 380A-380C of the terminal set 144 may be soldered within the plated through-holes 244A-244C, respectively.

Figure 16:
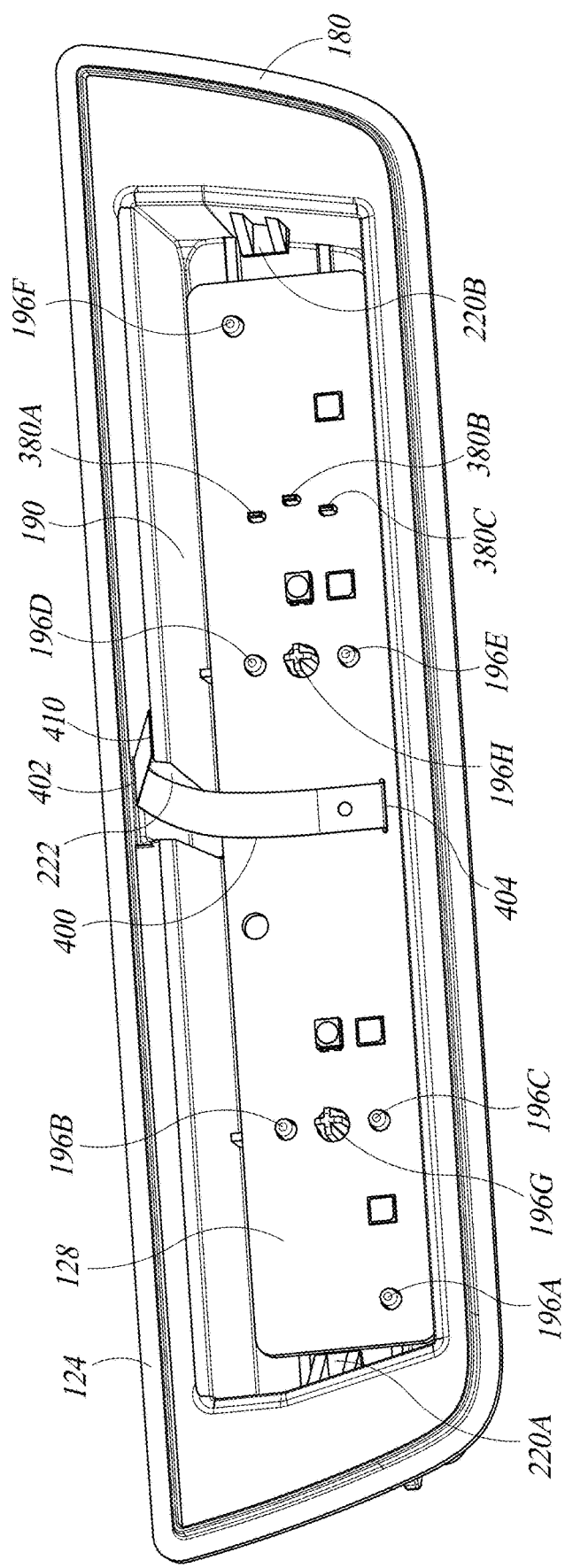
FIG. 16 is a front perspective view of the printed circuit board and the strip inserted into the housing of the lamp of FIG. 1.

Referring to FIG. 16, the PCB 128, with the strip 400 attached thereto, is inserted into the interior 190 of the housing 124. The mounting pegs 196A-196H are positioned within the mounting through-holes 236A-236H (see FIG. 9), respectively. Optionally, the mounting pegs 196A-196F may be heat-staked to the PCB 128. The strip 400 is positioned to extend frontwardly from the PCB 128 through the channel 222 of the housing 124. Thus, as shown in FIG. 16, the strip 400 may be curved or flexed. The second legs 384 (see FIGS. 8 and 9) of the contacts 380A-380C are positioned within the through-channels 210A-210C (see FIGS. 6 and 8), respectively.

Referring to FIG. 17, the reflector 140 is positioned inside the interior 190 of the housing 124. The mounting pegs 196G and 196H (see FIGS. 6 and 16) are positioned within the apertures 352G and 352H (see FIG. 14), respectively, of the reflector 140. Each of the mounting projection(s) 350 of the reflector 140 is positioned inside a different one of the reflector mounting through-holes 260 (see FIGS. 4 and 9) of the PCB 128. The strip 400 is positioned within the opening 370 formed in the peripheral portion 330 of the reflector 140. The reflector 140 is snapped into the housing 12 by inserting the tabs 220A and 220B (see FIGS. 6 and 16) inside the through-holes 340A and 340B, respectively. As mentioned above, the peripheral portion 330 is positioned adjacent the inwardly facing surface 193 of the sidewall 192 of the housing 124.

Referring to FIG. 18, next, the first end 410 of the strip 400 is fed into the through-channel 312 of the support grommet 136. The first bend 402, which has not yet been bent to form the first bend 274 (see FIGS. 3, 9, 10, and 20), allows more effective installation and positioning of the support grommet 136. The channel portion 300 of the support grommet 136 is positioned in the opening 370 formed in the peripheral portion 330 of the reflector 140. The rear portion 306 of the support grommet 136 is pushed into the opening 370 far enough to position the stop walls 310A (see FIGS. 11 and 12) and 310B against the sidewall portions 374A and 374B (see FIG. 14), respectively. The spacer portion 302 of the support grommet 136 is positioned against the reflector 140.

Figure 19:
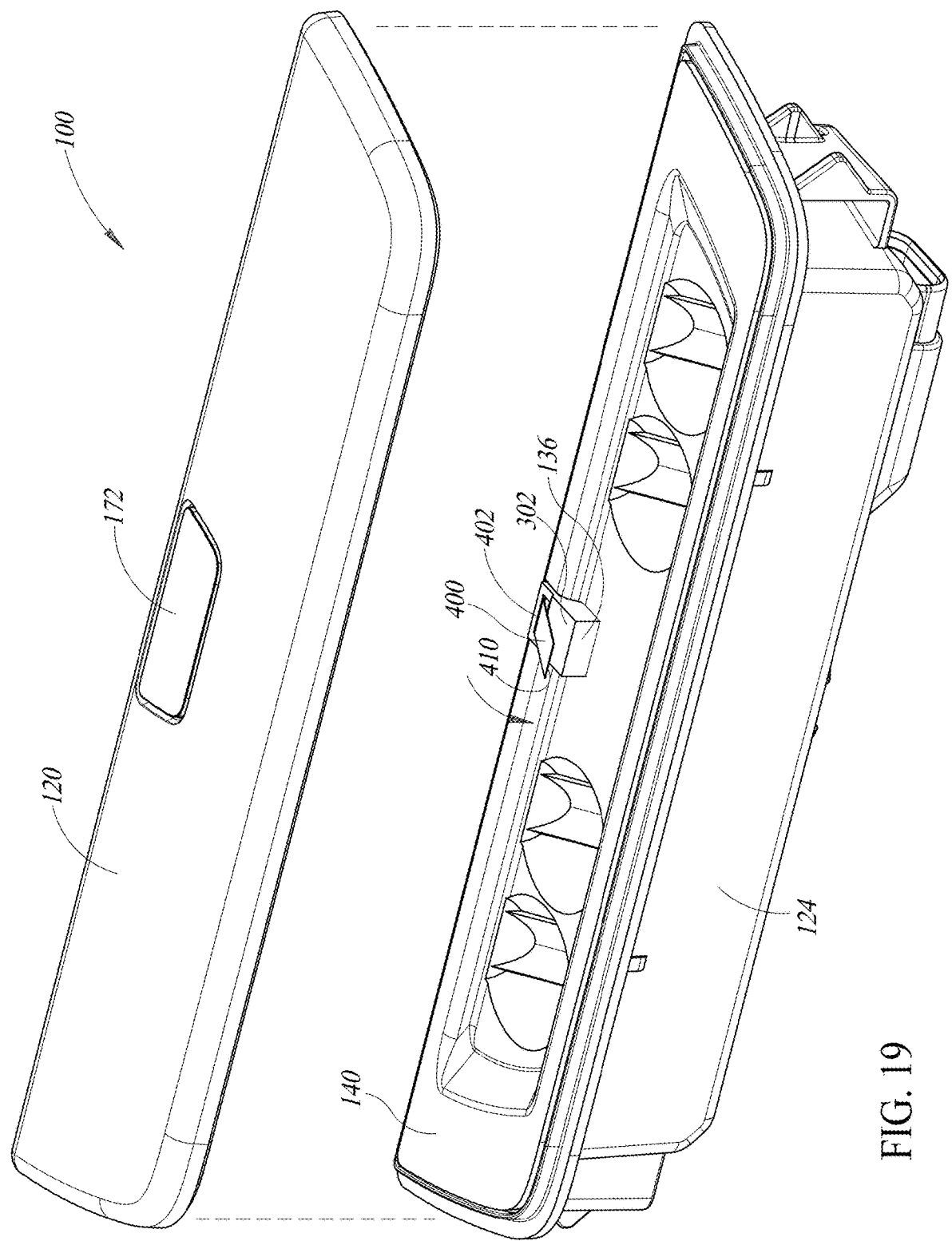
FIG. 19 is a bottom perspective view of the lens being attached to the housing of the lamp of FIG. 1.
Figure 20:
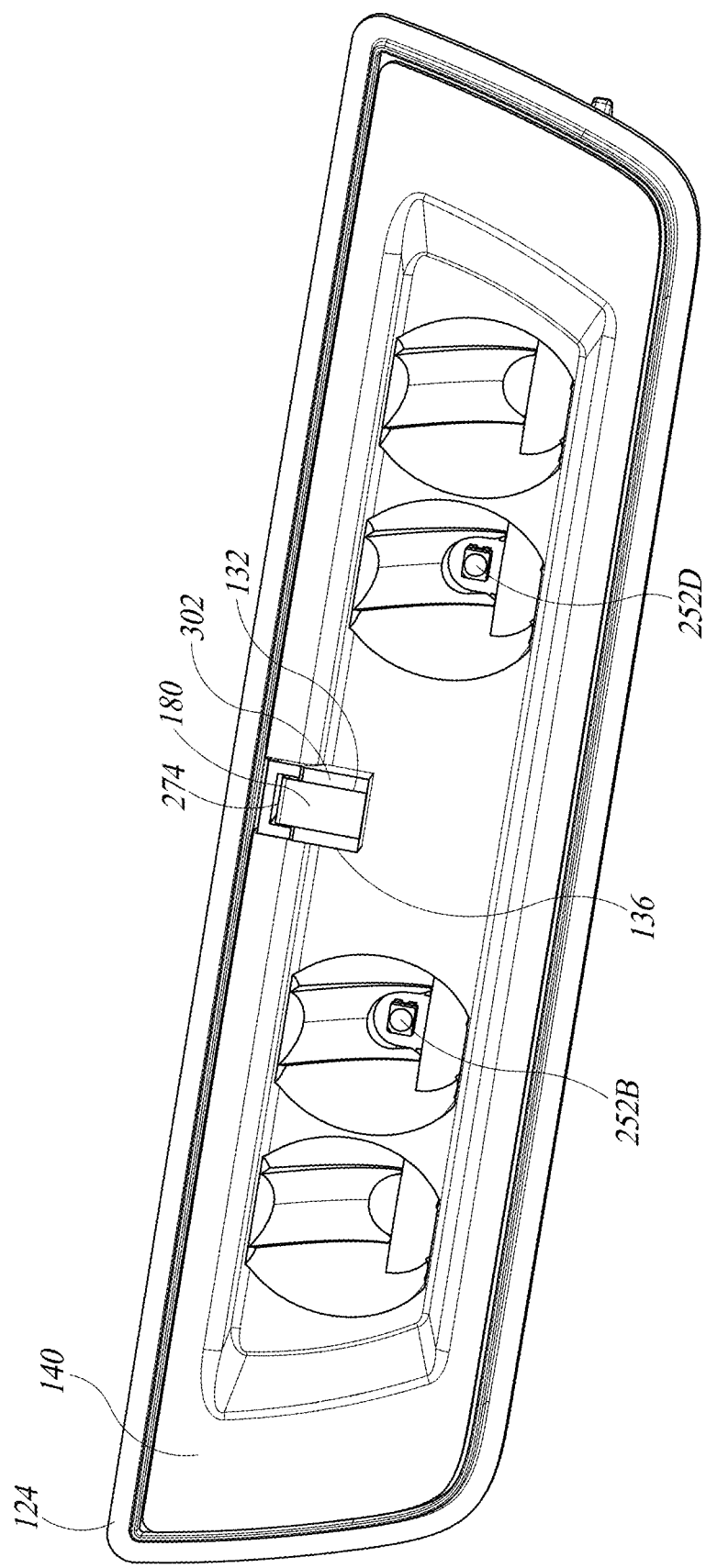
FIG. 20 is a front perspective view of the lamp of FIG. 1 omitting the lens.

Referring to FIG. 19, finally, the lens 120 is attached to the housing 124, which bends the strip 400 toward the spacer portion 302 of the support grommet 136 along the first bend 402. Referring to FIG. 20, this finishes forming the first bend 274 and completes the construction of the electrode 132. The lens 120 also compresses the support grommet 136 against the reflector 140. Referring to FIG. 3, the sensing portion 280 is positioned inside the recess 170 formed in the back facing surface 162 of the lens 120. Thus, the sensing portion 280 faces forwardly and is positioned on the opposite side of the lens 120 from the remote sensing portion 172. As mentioned above, the lens 120 may be sonic plastic welded or vibration welded to the housing 124. The vent patch 148 may be attached to the housing 124 to cover the vent hole(s) 202 at any point during the assembly process.

At this point, assembly of the lamp 100 is complete. The flexibility of the electrode 132 allows the lamp 100 to be assembled even when there is variation in a distance between the PCB 128 (see FIGS. 3, 4, 9, 15, and 16) and the lens 120. In contrast, a rigid electrode may be too short or too long and could interfere with assembly of the lens 120.

Alternate Embodiment

Figure 21:
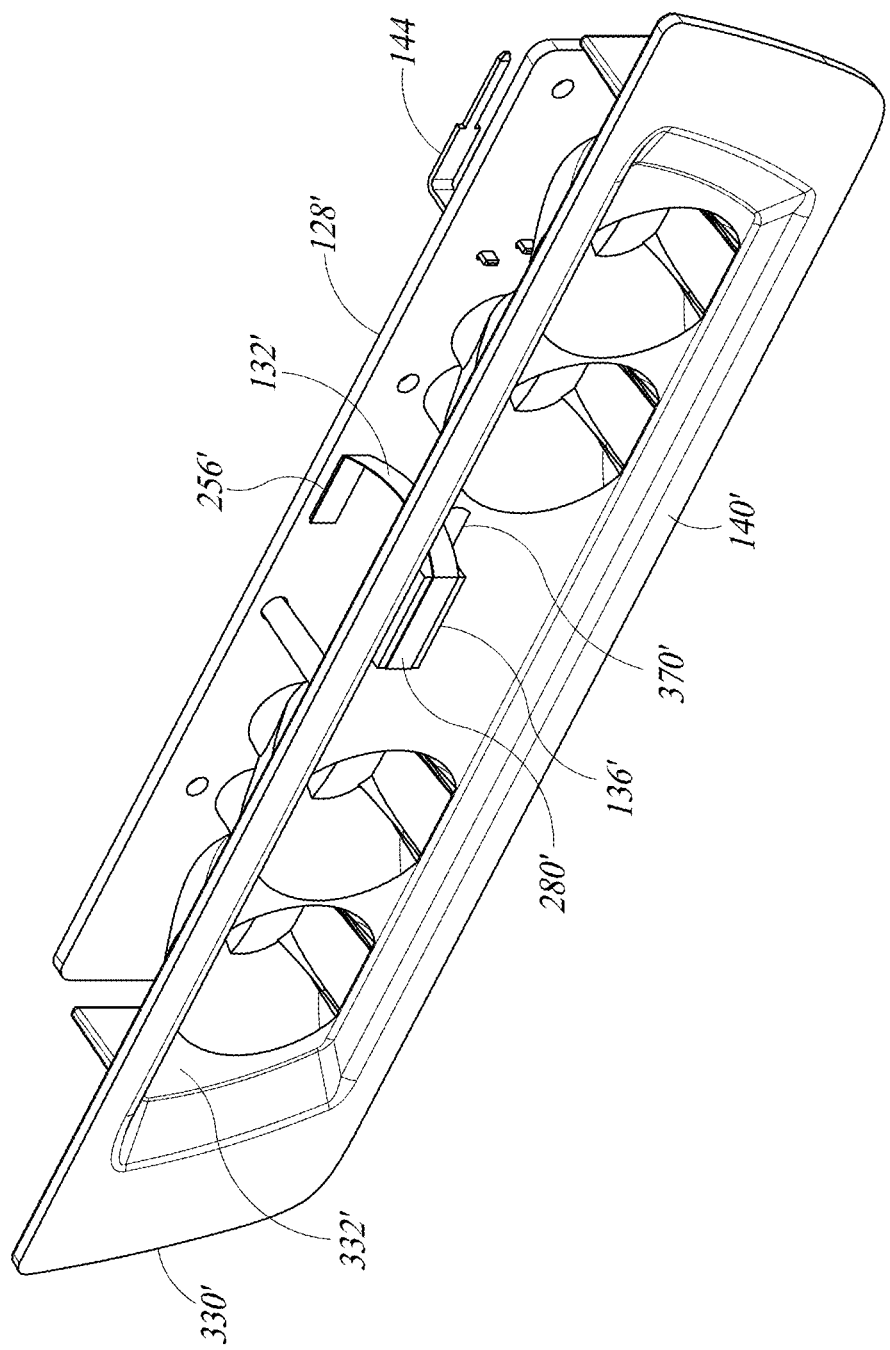
FIG. 21 is a front perspective view of alternate embodiments of the printed circuit board, the electrode, the support grommet, and the reflector that may be used to construct the lamp of FIG. 1.

FIG. 21 illustrates an alternate embodiment of a PCB 128', an electrode 132', a support grommet 136', and a reflector 140' that may be used with the lens 120 (see FIGS. 2-5 and 19), the housing 124 (see FIGS. 2-4, 6-8, and 16-20), the terminal set 144, and the vent patch 148 (see FIGS. 3 and 4) to construct the lamp 100.

The PCB 128' is substantially similar to the PCB 128 (see FIGS. 3, 4, 9, 15, and 16). Therefore, only differences between the PCB 128' and the PCB 128 (see FIGS. 3, 4, 9, 15, and 16) will be described in detail. As shown in FIG. 21, the PCB 128' differs from the PCB 128 only with respect to the location and orientation of the solder pad 256.

The electrode 132' is substantially similar to the electrode 132 (see FIGS. 3, 4, 9, 10, and 20). Therefore, only differences between the electrode 132' and the electrode 132 (see FIGS. 3, 4, 9, 10, and 20) will be described in detail. As shown in FIG. 21, the electrode 132' extends from the PCB 128' and through the reflector 140' along a substantially horizontal (front to back) travel path. In contrast, referring to FIG. 3, the electrode 132 extends from the PCB 128 and through the reflector 140 along both a vertical and horizontal travel path.

Referring to FIG. 21, the support grommet 136' is substantially similar to the support grommet 136 (see FIGS. 3, 4, 11, 12, and 18-20). Therefore, only differences between the support grommet 136' and the support grommet 136 (see FIGS. 3, 4, 11, 12, and 18-20) will be described in detail. The support grommet 136' may be implemented as a block of compressible material against with the sensing portion 280' of the electrode 132' rests. Thus, the support grommet 136' may omit the channel portion 300 (see FIGS. 11, 12, and 18).

The reflector 140' is substantially similar to the reflector 140 (see FIGS. 3, 4, 13, 14, and 17-20). Therefore, only differences between the reflector 140' and the reflector 140 (see FIGS. 3, 4, 13, 14, and 17-20) will be described in detail. In the reflector 140', an opening 370' is formed in a recessed portion 332' of the reflector 140' instead of in a peripheral portion 330' of the reflector 140'. Like in the reflector 140 (see FIGS. 3, 4, 13, 14, and 17-20), the peripheral portion 330' frames the recessed portion 332'.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A lamp comprising:
   a sensing circuit connected to a light source;
   a lens spaced apart from the sensing circuit, the lens comprising a forward facing surface opposite a backward facing surface; the forward facing surface comprising a sensing location; and
   an electrode having a first portion opposite a second portion, the first portion being connected to the sensing circuit, the second portion being positioned alongside the backward facing surface of the lens, the electrode being configured to sense an electric field through the lens at the sensing location, the sensing circuit being configured to turn on the light source when the light source is turned off and the electrode senses the electric field.

2. The lamp of claim 1, further comprising:
   a reflector positioned between the lens and the sensing circuit, the reflector being configured to direct light from the light source when the light source is turned on.

3. The lamp of claim 2, wherein the reflector comprises an opening, the electrode extends through the opening in the reflector, and the lamp further comprises:
   a support grommet configured to be received inside the opening, the support grommet comprising a through-channel, a lens facing side, and a reflector facing side, the electrode extending through the through-channel from the reflector facing side to the lens facing side, the electrode comprising a bend configured to position the second portion of the electrode against the lens facing side, the support grommet being configured to bias the second portion of the electrode against the backward facing surface of the lens.

4. The lamp of claim 3, wherein the support grommet is compressed between the lens and the reflector, and
   the support grommet exerts elastic pressure against the second portion of the electrode that biases the second portion of the electrode against the backward facing surface of the lens.

5. The lamp of claim 3, wherein the support grommet is constructed from an electrically non-conductive material, and the reflector is constructed from an electrically conductive material.

6. The lamp of claim 2, wherein the light source comprises a plurality of light emitting diodes, and the reflector comprises a plurality of reflecting portions each configured to direct light received from one or more of the plurality of light emitting diodes when the light source is turned on.

7. The lamp of claim 1, further comprising:

a printed circuit board upon which the sensing circuit is mounted, the first portion of the electrode being soldered to a solder pad mounted on the printed circuit board, the solder pad being in electrical communication with the sensing circuit.

8. The lamp of claim 7, further comprising:

a housing having a hollowing interior configured to house the printed circuit board, the light source, and the electrode, the lens being coupled to the housing and closing the interior, together the lens and the housing defining an enclosure without any openings through which a liquid or debris may enter the interior.

9. The lamp of claim 1, wherein the electrode is constructed from a flexible metal.

10. The lamp of claim 1, wherein the second portion of the electrode has an area of 15 mm$^2$ to 50 mm$^2$.

11. The lamp of claim 1, wherein the lens is free of through-holes and prevents liquids and debris from entering the lamp.

12. A method of constructing a lamp, the method comprising:

soldering an electrode to a solder pad mounted on a printed circuit board, the printed circuit board comprising a sensing circuit connected to the solder pad and one or more light emitting diodes, the solder pad being in electrical communication with the sensing circuit;

positioning the printed circuit board inside an interior of a housing, a free end portion of the electrode extending from the solder pad on the printed circuit board toward a front opening of the housing;

inserting a reflector into the front opening, the free end portion of the electrode extending through an opening in the reflector;

feeding the free end portion of the electrode through a channel formed in a support grommet;

positioning the support grommet inside the opening formed in the reflector; and attaching a lens to the front opening of the housing, the lens bending the free end portion of the electrode to position a sensing portion of the electrode alongside a front facing side of the support grommet, the sensing portion of the electrode being positioned alongside a backward facing surface of the lens, a front facing surface of the lens opposite the sensing portion of the electrode being a sensing portion, the sensing portion of the electrode being configured to sense an electric field through the lens, the sensing circuit being configured to turn on the one or more light emitting diodes when the one or more light emitting diodes are turned off and the electrode senses the electric field.

13. The method of claim 12, further comprising:

inserting a terminal set into plated through-holes formed in the printed circuit board, the plated through-holes being in electrical communication with the sensing circuit, the terminal set being configured to supply power to the sensing circuit via the plated through-holes.

14. The method of claim 13, further comprising:

inserting the terminal set through channels formed in the housing, the channels opening up into a first connector configured to mate with a second connector.

15. The method of claim 12, further comprising:

inserting an anchor portion of the electrode into a through-hole formed in the printed circuit board before the electrode is soldered to the solder pad.

16. A lamp comprising:

a lens with a rear facing surface;

an electrode having a sensing portion spaced apart from an anchor portion, the sensing portion being pressed against the rear facing surface of the lens; and a sensing circuit connected to a light source, the anchor portion of the electrode being in electrical communication with the sensing circuit, the electrode being configured to sense an electric field through the lens, the sensing circuit being configured to turn on the light source when the light source is turned off and the electrode senses the electric field, the sensing circuit being configured to turn off the light source when the light source is turned on and the electrode senses the electric field.

17. The lamp of claim 16, further comprising:

a support grommet configured to bias the sensing portion of the electrode against the rear facing surface of the lens.

18. The lamp of claim 16, further comprising:

a reflector positioned between the lens and the sensing circuit, the reflector being configured to direct light from the light source when the light source is turned on, the reflector and the electrode each being constructed from an electrically conductive material; and a support grommet configured to bias the sensing portion of the electrode against the rear facing surface of the lens, the support grommet being constructed from an electrically non-conductive material, the support grommet being positioned between the electrode and the reflector to insulate the electrode from the reflector.

19. The lamp of claim 18, wherein the reflector comprises an opening, a channel portion of the support grommet is positioned inside the opening, the channel portion of the support grommet has a through-channel formed therein, and the electrode extends through the through-channel.

20. The lamp of claim 19, wherein the support grommet has a biasing portion connected to the channel portion, the biasing portion is positioned between the reflector and the lens, the sensing portion of the electrode is positioned alongside the biasing portion of the support grommet, and the biasing portion of the support grommet biases the sensing portion of the electrode against the rear facing surface of the lens.

* * * * *